United States Patent [19]
Seynhaeve

[11] 4,340,990
[45] Jul. 27, 1982

[54] OBJECT INTENDED TO BE HELD IN THE HAND, IN PARTICULAR A SUITCASE HANDLE, AND A PROCESS FOR MANUFACTURING SAME

[75] Inventor: Andre G. Seynhaeve, Senlis, France

[73] Assignee: Societe Delsey, Bobigny, France

[21] Appl. No.: 104,805

[22] Filed: Dec. 18, 1979

[30] Foreign Application Priority Data

Dec. 28, 1978 [FR] France ................ 78 36695

[51] Int. Cl.³ .................................. A45C 13/26
[52] U.S. Cl. ............................ 16/126; 190/39; 190/58 R; 264/45.1; 264/DIG. 83
[58] Field of Search .......... 16/126, 125; 190/58 R, 190/57, 39; 264/DIG. 83, 45.1, 46.7

[56] References Cited

U.S. PATENT DOCUMENTS

| | | | |
|---|---|---|---|
| 3,161,436 | 12/1964 | Hood | 264/46.7 X |
| 3,444,967 | 5/1969 | Lautin | 16/126 X |
| 3,500,973 | 3/1970 | Bush | 190/57 |
| 3,813,729 | 6/1974 | Szabo | 16/126 X |
| 3,991,146 | 3/1975 | Barrie | 264/DIG. 83 X |

FOREIGN PATENT DOCUMENTS

1093924 12/1967 United Kingdom ............ 190/57
1156217 6/1969 United Kingdom .

*Primary Examiner*—Andrew V. Kundrat
*Attorney, Agent, or Firm*—Oblon, Fisher, Spivak, McClelland & Maier

[57] ABSTRACT

The present invention proposes a process for manufacturing an object intended to be held in the hand and which comprises a body made from a plastic material reinforced inside by means of a frame and comprising at least one grasping zone having a hardness less than that of its other parts. This process consists in placing the frame in a mould comprising an injection aperture in the part of its cavity corresponding to the grasping zone of the object, closing the mould, injecting into the cavity a definite amount of a compact plastic material, this amount being insufficient to completely fill the mould, then injecting an amount of expanded plastic material to completely fill the cavity, the expanded plastic material, which while penetrating inside the volume of the non-solidified compact material, forces this latter to come into contact with the whole internal surface of the cavity of the mould and to cover the frame, and removing the object from the mould after cooling of the two plastic materials.

12 Claims, 6 Drawing Figures

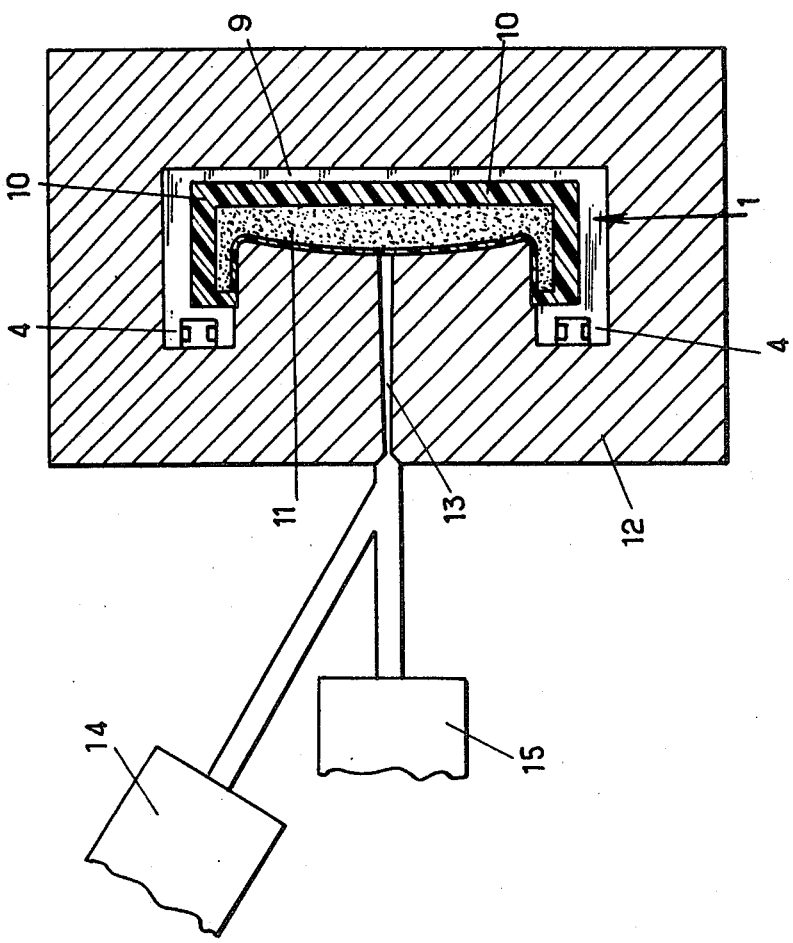
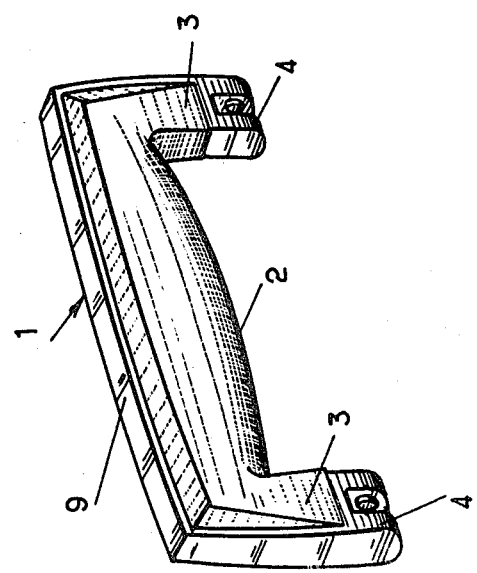

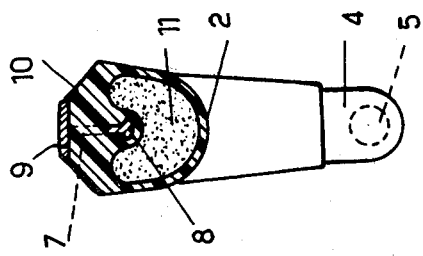
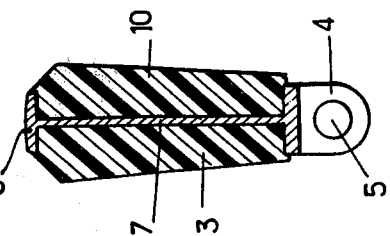
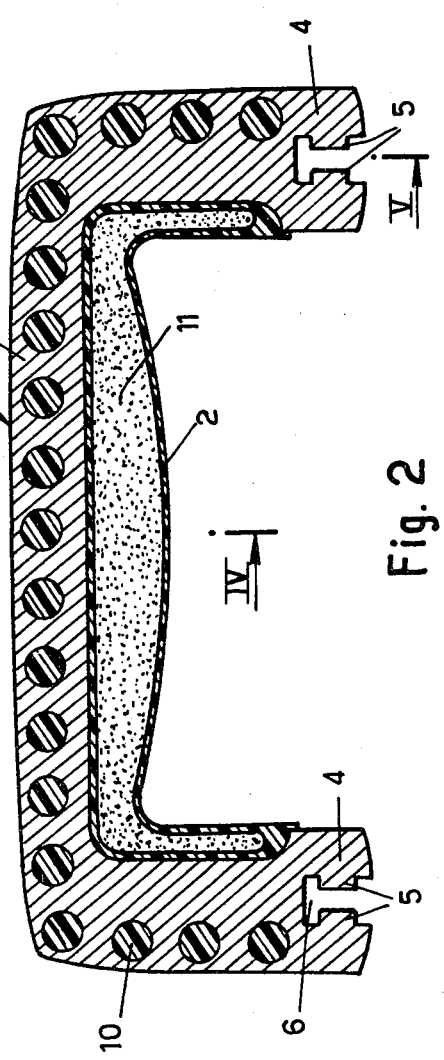
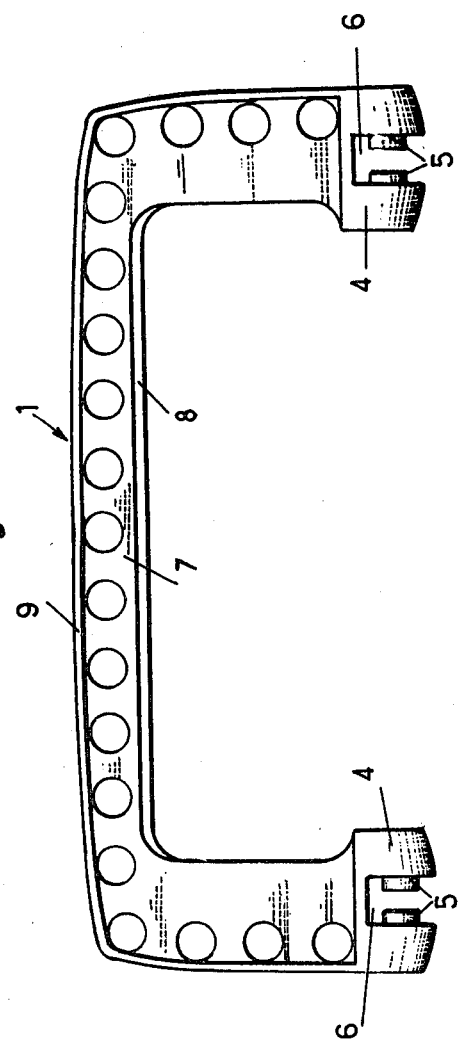

OBJECT INTENDED TO BE HELD IN THE HAND, IN PARTICULAR A SUITCASE HANDLE, AND A PROCESS FOR MANUFACTURING SAME

The present invention relates to an object intended to be held in the hand, for example a handle of a portable object, of the type comprising a body made from plastic material reinforced inside by means of a frame comprising at least one grasping zone.

The body of some handles is at present formed from several parts fitting into each other. It comprises in fact generally a rigid principal element forming the frame, a flexible part embedded in the principal element at the grasping zone, and a rigid part covering the frame so as to make it invisible.

These handles can however only be manufactured after a succession of operations often complicated, long and costly. The parts forming the body thereof must in fact be correctly fitted into each other before being locked together which is most frequently achieved by bonding or welding or another operation.

The disadvantages which have just been mentioned concerning suitcase handles are in fact to be found in all objects intended to be held in the hand, as for example motor vehicle steering wheels which are constructed with zones more flexible than others so as to make them more pleasant to the touch.

The present invention proposes remedying these disadvantages and, for this, it provides an object of the above-mentioned type which is characterized in that its body is formed from a metal frame covered with a compact injected plastic material in which is completely sunk an expanded plastic material extending principally in the grasping zone of the object.

With the special structure of its body, this object may now be manufactured under much more economic conditions. The manufacturing operations are in fact reduced to a single moulding operation which leads to the suppression of the fitting together and locking together steps necessary up to now.

The handles of portable objects are usually connected thereto by fitting means which are most often embedded in their body. Now, it happens that these fitting means become detached inopportunely under the weight of objects contained in the objects.

The present invention proposes a solution for avoiding this disadvantage of present handles. Thus, it relates more particularly to suitcase handle or similar which is characterized in that its frame has substantially the shape of a U, the expanded plastic material being essentially situated under the bottom edge of the base of the frame whose legs extend outside the body of the handle and carry at their ends means for fitting said handle to the portable object.

Since the fitting means now form an integral part of the frame, the risks that they become accidentally detached from the handle are totally eliminated. It will be readily understood moreover that the number of operations required for their fitting is thus reduced to the minimum, which contributes to a considerable reduction in the cost price of the handles.

Preferably, the fitting means provided at the end of each of the legs of the frame are formed by a hinged head carrying two pivot pins spaced apart and facing one another.

Naturally, the connection between the handle and the recipient will be all the easier to achieve since this latter comprises complementary fitting means capable of cooperating with the pivot pins.

According to one particular embodiment of the handle according to the invention, the frame is formed by a metal section comprising a flat web sunk in the compact plastic material and provided, on its part corresponding to the outer edge of the base and of the legs of the frame, a transverse insert projecting along the outer periphery of the body of the handle.

This transverse insert, whose role consists essentially in reinforcing the frame, also contributes to improving the general appearance of the handle.

Advantageously, the compact plastic material is formed by PVC, preferably flexible, whereas the expanded plastic material is formed by a PVC, polystyrene or polyurethane foam or any other cellular material.

The present invention also aims at improving the manufacture of objects intended to be held in the hand, of the type comprising a body made from plastic material reinforced inside with a frame and comprising at least one grasping zone having a hardness less than that of its other parts.

For this, it proposes a manufacturing process which is characterized in that it consists in placing the frame in a mould comprising at least one injection aperture in the part of its cavity corresponding to the grasping zone of the object, closing the mould, injecting into the cavity a definite amount of compact plastic material, this amount being insufficient to completely fill the cavity, then injecting an amount of expanded plastic material which, penetrating inside the volume of the non-solidified compact material forces this latter to come into contact with the whole of the internal surface of the cavity of the mould and to cover the frame, and removing the object from the mould after cooling of the two plastic materials.

With this process, the objects of the above-mentioned type may now be manufactured under much more economic conditions. In fact, since the two plastic materials are injected into the same mould during the same operation, the staff may be reduced, whereas the manufacturing rates are higher.

It will be noted that in the process of the invention, the expanded plastic material cannot come into contact with the walls of the cavity of the mould, nor into contact with the frame. When the compact plastic material reaches the walls of the mould and the frame under the thrust of the expanded plastic material, it cools in fact immediately on contact therewith so that it solidifies on the surface while forming a film sufficiently rigid for the expanded plastic material not to be able to pass therethrough. In the internal parts of the cavity of the mould where the compact material cools more slowly, the expanded material may on the contrary advance and spread therein to occupy well-defined zones.

Advantageously, the process of the invention proposes a new injection of compact plastic material immediately after the injection of the expanded material, the amount of compact plastic material injected in the second place being very small. The expanded plastic material present in the part of the object situated in front of the injection aperture is thus made invisible by the new injection of compact material, which improves the aesthetic appearance of the finished product.

Preferably, the frame, when it is in position in the cavity of the mould, is maintained at a distance from the injection aperture. Taking into account the volume defined between the frame and the wall of the mould which is adjacent the injection aperture, the mass of compact plastic material injected into this volume may be relatively high so that its internal temperature tends to be reduced slowly, which allows the expanded plastic material to spread into relatively distant zones of the injection orifice.

In the particular case where the object to be manufactured is the handle of a portable recipient such as a suitcase, the process according to the invention provides for the use of a frame formed by a U-shaped metal section, this frame being placed in the mould so that the injection aperture emerges in front of the central part of the inner edge of its base.

Advantageously, the free ends of the legs of the frame are situated outside the cavity of the mould and carry at their ends means for fitting the handle to the portable recipient.

To reinforce the strength of the body of the handle and to improve the general appearance thereof, the flat web is furthermore provided with a transverse insert on its part corresponding to the outer edge of the base and of the legs of the frame, this insert being situated on one side of the cavity of the mould.

Furthermore, to improve the anchoring of the compact plastic material on the frame, it is advantageous for the flat web to be perforated.

One embodiment of the present invention is described hereafter with reference to the accompanying drawings in which:

FIG. 1 is a perspective view of a suitcase handle in accordance with the invention;

FIG. 2 is a front view of the frame of this handle;

FIG. 3 is a view in longitudinal section of the handle;

FIG. 4 is a sectional view along line IV—IV of FIG. 3;

FIG. 5 is a sectional view along line V—V of FIG. 3; and

FIG. 6 is a schematic sectional view showing the mould used for manufacturing the handle.

The suitcase handle shown in the drawings comprises a body made from a plastic material reinforced by means of a frame 1 and has a grasping zone 2 in its part connecting the roots of its uprights 3.

Frame 1 is formed by a metal U-shaped section. The free end of each of its legs is extended by a hinge head 4 comprising two opposite pivot pins 5 projecting from the facing walls of a slot 6. As can be seen in FIG. 1, the hinge heads 4 project outside the body of the handle so that their pivot pins may be associated with complementary hinge means carried by the suitcase.

The metal section forming the frame comprises a flat perforated web 7 carrying a transverse narrow insert 8 on the inner edge of its base and a much wider transverse web 9 which extends along the outer edge of its base and its branches. Referring to FIG. 1, it will be noticed that insert 9 is visible along the outer periphery of the body of the handle.

In accordance with the invention, the body of the handle is formed from a compact plastic material 10 in which is entirely sunk an expanded plastic material 11, which extends into the grasping zone 2. The compact material 10 is polyvinyl chloride, preferably flexible, whereas the expanded plastic material 11 is a PVC foam. It will however be understood that other materials could be used instead of those which have just been mentioned here.

Referring more particularly to FIGS. 3 and 4, it will be noted that the compact material 10 is placed between the expanded material 11 and the flat web 7 with which it is integral.

To manufacture the handle which has just been described, this is how to set about it:

The frame 1 is first of all placed in a mould 12 only a part of which can be seen in FIG. 6. This mould, which comprises an injection aperture 13 emerging into the part of its cavity corresponding with the center of the grasping zone 2 of the handle, is shaped inside so that the insert 9 and the hinge heads 4 of the frame cannot be reached by the plastic materials which will be injected into the cavity.

With the frame in place, the mould is closed and the compact plastic material 10 is then injected into its cavity. For this, the injection aperture 13 is connected to an injection machine comprising two injection heads 14 and 15, the first supplying the compact material 10 whereas the second is intended to supply the expanded material 11. The injected compact material occupies approximately half the volume of the cavity of the mould and accumulates behind the injection aperture.

Immediately after injection of the compact material 10, the expanded plastic material 11 is injected, this being supplied by nozzle 15 and completely filling the cavity of the mould. During its injection, the expanded material 11 penetrates into the mass of the compact material while forcing it into the parts of the cavity which are not yet full. In fact, the compact material behaves like a balloon which is inflated with the expanded material. While moving under the thrust of this latter, the compact material comes into contact with the frame and with the internal surface of the cavity of the mould. Now, on contact, it cools sufficiently to solidify on the surface and to form a thin film which the expanded material cannot pass through. Since the internal zones of the compact material cool on the contrary more slowly, the expanded material may easily advance and spread out therein.

After the expanded material 11 has been injected, a new and very small injection of compact material is effected so that the expanded material present in front of the injection aperture 13 is not visible on the handle.

Finally, the handle is removed from the mould when the cooling of the two injected plastic materials reaches a sufficient degree.

I claim:

1. A handle for a portable object, comprising:
 a body formed from a compact moulded plastic material, said body having a grasping zone whose hardness is less than that of the remainder of said body;
 an expanded plastic material entirely located within said body and only in said grasping zone; and
 a frame formed by a U-shape metal section having a flat web including inner and outer edges, said outer edge having a transverse web extending along the base and legs of said U-shape frame, the ends of said legs including means for fitting said handle to said portable object,
 wherein said flat web is located within said body with said means for fitting extending outside of said body, wherein said transverse web is located along the outer periphery of said body, and wherein said expanded plastic material is positioned inward from said inner edge of the base of said U-shape frame.

2. A handle according to claim 1, wherein said fitting means provided at the end of each of the legs of the frame are formed by a hinge head carrying two pivot pins spaced apart and facing each other.

3. An object according to claim 1 wherein the compact plastic material is formed by one from the group consisting of PVC and flexible PVC, and the expanded plastic material is formed by one from the group consisting of PVC, polystyrene and polyurethane foam.

4. A process for manufacturing a handle for an object, said handle including a metal reinforcing frame embeded in a body of compact plastic and having at least one grasping zone having a hardness less than the remainder of said handle, said process comprising the steps of:
  placing said frame against one wall of a mould having at least one injection aperture in another wall portion of the cavity of said mould and opposite said one wall and corresponding to said at least one grasping zone;
  closing said mould;
  injecting a first predetermined amount of compact plastic material into said cavity, said first predetermined amount being insufficient to fill said cavity;
  injecting a second predetermined amount of expanded plastic material into said cavity, whereby said expanded plastic material penetrates within the non-solidified volume of said compact plastic material and forces said compact plastic material into contact with the internal surface of said cavity and to cover the portion of said frame not in contact with the walls of said cavity;
  injecting a third predetermined amount of compact plastic material into said cavity immediately after the injection of said expanded plastic material, said third predetermined amount being smaller than said first predetermined amount, whereby a thin encapsulation of said expanded plastic material is formed so as to provide said reduced hardness for said at least one grasping zone;
  permitting said injected plastic materials to cool in said cavity; and
  removing the object from said mould.

5. A process according to claim 4 wherein said frame, when it is in position in the cavity of the mould, is maintained at a distance from each said at least one injection aperture.

6. A process according to claim 4 wherein said frame is formed by a metal U-shaped section and is placed in the mould so that each said at least one injection aperture emerges in front of the central part of the inner edge of the base of said U-shape.

7. A process according to claim 6, wherein the free ends of the legs of the U-shape of the frame are situated outside the cavity of the mould.

8. A process according to claim 7, characterized in that the free ends of the legs of the frame carry at their ends means for fitting the handle to said object.

9. A process according to claim 6 wherein said metal frame comprises a flat web provided with a transverse web on its part corresponding to the inner edge of the base of the frame.

10. A process according to claim 9, wherein said flat web is furthermore provided with a transverse web on its parts corresponding to the outer edge of the base and the legs of the frame, this transverse web being situated outside the vacity of the mould.

11. A process according to claim 9 or 10 wherein said flat web is perforated.

12. A process according to claim 4 or 5 wherein said compact plastic material is one from the group consisting of PVC and flexible PVC, whereas the expanded plastic material is one from the group consisting of PVC, polystyrene and polyurethane foam.

* * * * *